United States Patent [19]

Anderson

[11] 3,851,486
[45] Dec. 3, 1974

[54] GATE SETTING DEVICE

[76] Inventor: John Everett Anderson, P.O. Box 812, Eagle Lake, Tex. 77434

[22] Filed: July 30, 1973

[21] Appl. No.: 383,916

[52] U.S. Cl.................. 61/63, 172/277, 172/801, 214/145, 214/620
[51] Int. Cl........................... E02b 7/20, E02f 5/16
[58] Field of Search......... 61/63, 12; 172/801, 277, 172/784, 667; 214/145, 620; 254/132, 29

[56] References Cited
UNITED STATES PATENTS
2,933,838   4/1960   Rockwell................... 172/277 X 3,670,508   6/1972   Engler......................... 61/63
3,780,813   12/1973  Davis et al................. 172/801

FOREIGN PATENTS OR APPLICATIONS
1,450,809   7/1966   France....................... 172/801

Primary Examiner—Jacob Shapiro

[57] ABSTRACT

Apparatus for setting a levee gate including a plow element attached to a tractor for forming an opening in a levee by moving the tractor along the levee and a gate setting mechanism for setting a levee gate in the opening, the gate setting mechanism being convertible into a crane.

7 Claims, 2 Drawing Figures

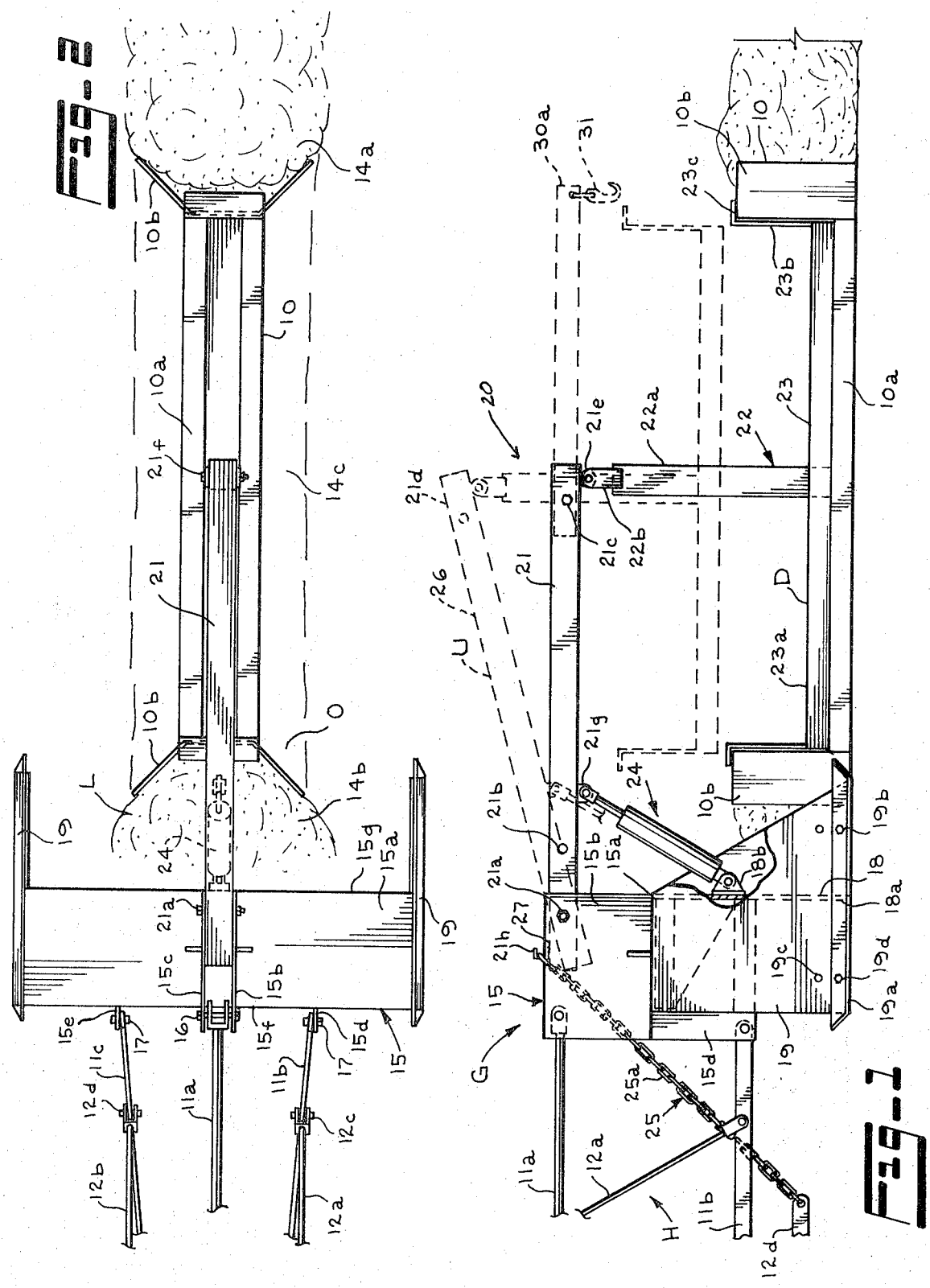

3,851,486

GATE SETTING DEVICE

BACKGROUND OF THE INVENTION

The field of this invention is the providing of gates in levees.

In some types of farming operations such as rice farming, earth levees are used to confine and control irrigation water. These levees must be provided with gates for the transfer of water as needed. Levee gates generally include a gate frame (for supporting the gate) that is mounted in an opening in the levee. The gate frame should be firmly set into the levee opening to prevent any leakage between the levee and the gate frame. In the past, one method of setting gate frames was to do it manually. U.S. Pat. No. 3,670,508, issued to Engler, discloses a gate setting device operable with a tractor and including two scoops for removing earth from a levee to form an opening. One difficulty with the gate setting device of the Engler patent is that the device is operable only with the tractor positioned for movement perpendicular to the longitudinal axis of a levee. Positioning of the tractor perpendicular to the levee may make it more difficult to align the gate with the levee. The possibility of a levee being run over by the tractor may also be high. Also, the two scoops of the Engler patented device must be mounted for movement relative to each other and to the tractor, which requires a complicated frame and additional power equipment.

SUMMARY OF THE INVENTION

It is an object of this invention to provide a new and improved gate setting device that is simple and economical in construction and may be operated easily and conveniently with a tractor for effectively setting levee gates in levees. It is a further object of this invention to provide a gate setting device which is operable by movement of the tractor in the direction of the levee as opposed to having to position the tractor perpendicular to the levee.

It is another object of this invention to provide a gate setting device which can be converted into a crane for general purpose use.

These and other objects of this invention are provided by a gate setting device for use in conjunction with a tractor having a tractor mounted lift means. The gate setting device includes a main frame section and connect means for connecting the main frame section for pivotal movement with respect to the tractor lift means. The main frame section includes an earth moving blade for cooperating with the tractor and the tractor lift means for displacing the earth away from a particular area in the levee in order to form an opening by movement of the tractor along the levee. A gate setting mechanism is operably connected to the main frame section for pressing downwardly a gate frame into the ground of the levee opening. The gate setting means includes a power arm connected to the main frame section and having mounted thereon a shoe means for actually engaging the gate frame for seating the gate frame into the levee opening.

The gate setting means is convertible into a crane by positioning of a telescoping section of the power arm outwardly.

BRIEF DESCRIPTION OF THE DRAWINGS

FIG. 1 is a side view of the gate setting apparatus of the preferred embodiment of this invention illustrating the conversion of the device into a crane; and FIG. 2 is a top view of the gate setting apparatus illustrating the positioning of a gate frame in a levee opening.

DESCRIPTION OF THE PREFERRED EMBODIMENT

Referring to the drawings, the letter G generally designates the gate setting device of the preferred embodiment of this invention for use in conjunction with a tractor and tractor hitch H for setting the gate frame 10 of a levee gate into an opening O in a levee L. The tractor used with the gate setting device G may be of any conventional construction. The tractor hitch H is a typical "three point" hitch which includes a top rod 11a and two bottom parallel rods 11b and 11c. The three point hitch H includes a lifting means represented by lifting rods 12a and 12b which are pivotally connected at pivot points 12c and 12d, respectively, to the bottom hitch rods 11b and 11c, respectively. The lifting rods 12a and 12b are suitably attached to a source of lifting and lowering power on the tractor in a well known manner. Operation of the lifting rods 12a and 12b causes vertical movement upwardly and downwardly of any device attached to the three point hitch H, that is, any device attached to the top hitch rod 11a and the bottom hitch rods 11b and 11 c. The levee L is typically an earthen levee which is formed by suitable earth moving means and is utilized to divide farm acreage into sections for holding and transferring irrigation water. The levee L is triangular in a cross-section taken transverse to the length or longitudinal axis of the levee L.

The gate frame 10 is typical of the gate frames used for levees. The gate frame 10 includes a bottom portion 10a and two side portions or wings 10b which are adapted to be positioned against the earthen side portions 14a and 14b of the levee opening O. The gate frame 10 is adapted to receive a gate (not shown) between the gate wings 10b.

The gate setting apparatus G includes a main frame section generally designated as 15. The main frame section 15 includes a rectangular tubular member 15a having welded or otherwise attached thereto two parallel, upstanding support panels 15b and 15c. The top hitch member 11a is pivotally connected between the upstanding panels 15b and 15c by any suitable connection such as the pin and lug connection illustrated at 16. The two bottom hitch rods 11b and 11c are pivotally connected to the downwardly extending braces 15d and 15e, respectively, by a suitable bolt connection 17. In this manner, the main frame section 15 is connected to the three point hitch H for pivotal movement with respect to the rods 11a – 11c of the three point hitch H.

An earth moving blade 18 is welded or otherwise attached to the rear edge 15g of the tubular member 15a and extends downwardly therefrom. The earth moving blade 18 may have a specially machined bottom cutting edge 18a. The earth moving blade 18 has two side plates 19 welded or otherwise attached to the blade sides. The side plates 19 have mounted at the bottom edges thereof adjustable skids 19a which are adapted to engage the ground. The skids 19a are attached to the side plates 19 by means of bolts such as 19b. The side plates 19 are provided with several pairs 19c and 19d of aligned holes into which the skids 19a can be mounted. In this manner, the distance of the bottom cutting blade edge 18a from the ground can be varied as desired, thus varying the final cutting elevation of the blade 18. Thus, by mounting the skids 19a in the pairs of side plate openings 19d, the cutting edge 18a of the earth moving blade 18 is positioned a certain distance off the ground, which provides for a leveling or removal of earth to a certain elevation. If it is desired to reduce that final elevation, the skids may be mounted in the second pair of openings 19c in the side plate 19 thus lowering the blade cutting edge 18a closer to the ground engaged by the skids 19a. In this manner, the blade 18 is capable of cutting the earth or removing the earth to a lower elevation when the skids 19a are mounted in the pairs of side plate openings 19d. In this manner, the final elevation of levee opening bottom 14c can be varied by adjusting the position of the skids 19a on the side plates 19.

A gate setting means generally designated as 20 is operably connected to the main frame section 15 for engaging and setting the gate frame 10 in the levee opening O. The gate setting means 20 includes a power arm 21 that is pivotally connected by bolt 21a between the upstanding support panels 15b and 15c. The power arm 21 may be a "box" or a square-shaped channel member which is hollow. The power arm 21 includes an opening (not shown) through which the bolt 21a extends for mounting the power arm for pivotal movement with respect to the support panels 15b and 15c. Openings 21b and 21c are also machined into the power arm 21. The sleeve 21e is welded to the underside of the outer end 21d of the power arm 21.

A shoe means generally designated as 22 is pivotally connected to the outer power arm end 21d for actually engaging the gate frame 10. The shoe means includes a shoe post 22a which includes spaced, end lugs 22b which may be positioned on either side of the sleeve 21e. A suitable bolt 21f extends through the post lugs 22b and the sleeve 21e in order to pivotally mount the shoe post for pivotal movement in a direction approximately parallel to the length or longitudinal axis of the levee L, itself. A shoe member 23 is attached to the shoe post 22a. The shoe member 23 is a generally U-shaped member adapted to conform to the configuration of gate frame 10. The shoe member 23 includes a main, flat bottom portion 23a adapted to engage the gate bottom 10a. The shoe member 23 further includes sides 23b having lips or edges 23c which are adapted to engage the inside and top of the gate wings 10b. In this manner, the shoe member 23 is adapted to fit in the inside of the gate frame 10 and to uniformly press the gate frame into the levee opening O. Of course, not only the shoe post 22a but also the attached shoe member 23 is mounted by the pivotal connection to sleeve 21e for pivotal movement in substantially one plane only, a plane substantially parallel to the longitudinal axis of the levee L as illustrated with the machine or device G in the position of FIG. 2. In this manner, once the shoe member 23 is properly aligned with the longitudinal axis or center of the levee L, the pivotal connection to the shoe post 22a substantially maintains the shoe member 23 in that plane of alighment even as the power arm lowers the shoe member downwardly into engagement with the gate 10.

Hydraulic power means generally designated as 24 is pivotally connected between the power arm 21 and the earth moving blade 18 in order to move the power arm between the up position illustrated in scored lines and generally designated as U and the down position illustrated in solid lines and generally designated as D in FIG. 1. It should be understood that the up position for the power arm includes any position substantially between the down position illustrated in FIG. 1 and a substantially vertical position. The hydraulic power means 24 is a hydraulic cylinder assembly which is pivotally connected to lugs 18b on the earth moving blade 18 and to lugs 21g on the bottom of the power arm 21. The hydraulic cylinder assembly 24 is typical of such hydraulic cylinder asssemblies or jacks and is suitably powered by hydraulic fluid under pressure which may be provided from a hydraulic power source on the tractor or from any other hydraulic power source.

A leverage means generally designated as 25 including a chain 25a is connected between the power arm 21 and a draw bar 12d attached to the tractor by any suitable means. The chain 25a is connected to the draw bar 12d through an opening in the draw bar and is connected to the power arm 21 through a hook 21h. Any suitable chain attachment can be used; however, it is desirable to use a hook or similar device to allow for adjustment of the chain tension. For purposes of definition, the pivotal mounting of the power arm by the bolt 21a may be considered to divide the power arm into a long section extending between the bolt 21a and the outer end 21d, the long section being generally designated as 26. The short section or short end of the power arm 21 is herewith designated as 27. With the power arm 21 and the shoe means 22 in the up position illustrated in scored lines and designated as U, the chain 25a is slack. However, when the power arm and the shoe means 22 is moved downwardly into engagement with a gate frame, the chain 25a becomes taut due to upward movement of the short power arm section 27. The taut chain 25a operates to provide leverage to the power arm 21 by transfering forces acting to push the main frame section 15 upwardly through the chain 25a to the tractor.

The gate setting apparatus G can be converted into a general purpose crane if desired. First, the shoe means 22, including the shoe post 22a and the shoe member 23, is removed from pivotal connection to the power arm 21. This is accomplished by simply removing the bolt 21f. The power arm 21 includes a crane section illustrated in scored lines at 30, the crane section 30 is generally telescoped substantially within the power arm 21 when the gate setting device G is being utilized to set levee gates. A pin or bolt inserted in power arm openings 21b acts to lock the crane section 30 in a withdrawn position. However, when it is desired to utilize the device as a general purpose crane, and, after removal of the shoe means 22, the crane section 30 is moved to an extended position outwardly of the power arm 21, the extended position being illustrated in FIG. 1. A bolt is inserted through the openings 21c in the power arm 21 and through an aligned opening in the crane section 30 in order to secure the crane section in an extended position outwardly of the power arm 21. Any suitable hook 31 can be mounted onto the outer end 30a of the crane section 30 in order to provide a lifting point. Operation of the hydraulic power assembly 24 will cause pivotal movement of the power arm 21 and extended crane section 30 upwardly and downwardly as desired.

OPERATION AND USE

In the use of the gate setting apparatus G of the preferred embodiment of this invention, the device is attached to the three point hitch H as previously described. Then, the tractor is driven over a levee L in a direction parallel to the length or longitudinal axis of the levee. The levee opening O is formed by utilizing the tractor lifting means and lift rods 12a and 12b to lower the earth moving blade 18 into the earth of the levee L. The tractor is moved backwards and forward and the blade 18 is gradually lowered even further downwardly until the opening O has been cleared. The final elevation of the bottom 14c of the levee opening O is determined by the adjustably mounted skids 19a as previously described. Of course, the lift rods 12a provide for the lifting of the entire gate device G through the pivotal connection to the bottom hitch rods 11b and 11c. During the use of the tractor and gate setting device to clear the earth and form a levee opening O, the power arm 21 and the shoe means 22 connected thereto are in the up position illustrated in scored lines of FIG. 1. The chain 25a is slack to allow the main frame section 15 and blade 18 to be raised and lowered as needed.

After the opening O has been cleared such that the levee opening bottom 14c is at the desired elevation, an operator sets a levee gate 10 in position in the opening O in alignment with the direction of the levee L as desired. The hydraulic cylinder assembly 24 is then operated to lower the power arm 21 downwardly until the shoe member 23 is in engagement with the gate 10 setting in the opening O. Further contraction of the hydraulic cylinder assembly causes the shoe member 23 to engage and press the gate into a seated position in the levee opening O. During this seating of the gate 10, the chain 25a is taut such that the chain 25a acts to lock the hitch H against pivotal movement to transmit the lifting forces acting against the main frame section 15 to the weight of the tractor, itself. Thus, the chain 25a serves to transmit the leverage to the weight of the tractor so that greater force can be applied to press the shoe member 23 against the gate frame 10. After the gate frame 10 is properly positioned, the gate (not shown) can be mounted within the gate frame. Also, the power arm 21 can be moved again to the up position U and the tractor and blade can be manipulated to back fill dirt in firmly against the gate frame wings 10b. If desired, the tractor may be rocked back and forth when setting the gate such that the shoe member intermittently engages the gate frame 10 with even greater force to further seat the gate in the levee opening bottom 14c.

If at any time it is desired to utilize the gate setting device G as a general purpose crane, the shoe means, including the shoe post 22a and the shoe member 23, are removed by removing the bolt 21f. The crane section 30 is then moved outwardly of its telescoped inward position within the power arm 21 to the position illustrated in scored lines in FIG. 1. A lock pin or a bolt is extended through the openings 21c in the power arm 21 in order to secure the position of the crane section outwardly of the power arm 21. The hook 31 is then placed onto outer crane section in 30a as illustrated. Operation of the hydraulic cylinder 24 will cause pivotal movement of the power arm 21 and crane section 30 upwardly and downwardly in order to lift and lower elements attached or hung from the hook 31 as desired. The crane can also be operated without removal of the shoe member 23 and post 22a if desired.

The foregoing disclosure and description of the invention are illustrative and explanatory thereof, and various changes in the size, shape, and materials as well as in the details of the illustrated construction may be made without departing from the spirit of the invention.

I claim:

1. Apparatus for use in conjunction with a tractor including a tractor mounted lift means, for placing a gate frame in a levee, comprising:
    a main frame section;
    connect means connecting said main frame section for pivotal movement with said tractor lift means;

said main frame section including earth moving means cooperating with said tractor lift means for forming an opening in a levee by movement of said tractor along said levee; and
    gate setting means mounted with said main frame section for setting a gate frame into the ground of said opening in said levee, including:
    a power arm mounting with said main frame section for pivotal movement with respect thereto,
    shoe means pivotally attached to said power arm for engaging said gate frame; and
    power means connected to said power arm and to said frame section for moving said shoe means downwardly into engagement with said gate frame and for pressing said gate frame into the ground of said opening; and
    mount means mounting said shoe means for pivotal movement substantially parallel to said levee only.

2. The structure set forth in claim 1 including:
    a power arm pivotally mounted onto said main frame section, said power arm including a first section pivotally mounted on said main frame section and a second section extendable outwardly to an extended position for functioning as a lift mechanism.

3. The structure set forth in claim 1, including:
    conversion means for converting said power arm into a crane.

4. The structure set forth in claim 1, including:
    means for adjusting said earth moving means for varying the elevation of the bottom of the opening formed by said earth moving means.

5. The structure set forth in claim 1, wherein said earth moving means includes:
    a blade adapted for moving the earth of said levee by movement of said tractor; and
    a pair of skids mounted at opposite ends of said blade for determining the effective height of said blade.

6. The structure set forth in claim 1, including:
    a chain attached to said power arm and to said tractor for providing leverage for said power means for pressing said gate frame into said ground at said opening.

7. The structure set forth in claim 1, wherein:
    said mount means mounting said shoe means for pivotal movement with respect to said power arm in substantially one plane only.

* * * * *